(12) United States Patent
Yang et al.

(10) Patent No.: US 12,052,190 B2
(45) Date of Patent: Jul. 30, 2024

(54) BEAM MEASUREMENT METHOD, NETWORK-SIDE DEVICE, TERMINAL DEVICE, AND STORAGE MEDIUM

(71) Applicant: VIVO MOBILE COMMUNICATION CO., LTD., Guangdong (CN)

(72) Inventors: Yu Yang, Chang'an Dongguan (CN); Xueming Pan, Chang'an Dongguan (CN); Peng Sun, Chang'an Dongguan (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 364 days.

(21) Appl. No.: 17/127,645

(22) Filed: Dec. 18, 2020

(65) Prior Publication Data

US 2021/0111849 A1  Apr. 15, 2021

Related U.S. Application Data

(63) Continuation of application No. PCT/CN2019/090815, filed on Jun. 12, 2019.

(30) Foreign Application Priority Data

Jun. 22, 2018  (CN) .......................... 201810651975.9

(51) Int. Cl.
*H04L 5/00* (2006.01)
*H04B 7/0408* (2017.01)
*H04W 24/08* (2009.01)

(52) U.S. Cl.
CPC ......... *H04L 5/0048* (2013.01); *H04B 7/0408* (2013.01); *H04W 24/08* (2013.01)

(58) Field of Classification Search
CPC ... H04L 5/0048; H04L 5/0057; H04L 5/0053; H04B 7/0408; H04B 7/0626;
(Continued)

(56) References Cited

U.S. PATENT DOCUMENTS 10,574,325 B2 * 2/2020 Park .................... H04B 7/0628
2016/0227428 A1 * 8/2016 Novlan ................. H04W 48/16
(Continued)

FOREIGN PATENT DOCUMENTS

CN        105451341 A  *  3/2016
CN        105451341 A      3/2016
(Continued)

OTHER PUBLICATIONS

CN Office Action in Application No. 201810651975.9 dated May 6, 2020.
(Continued)

*Primary Examiner* — Ayaz R Sheikh
*Assistant Examiner* — Louis Samara
(74) *Attorney, Agent, or Firm* — Price Heneveld, LLP

(57) ABSTRACT

A beam measurement method, a network-side device, a terminal device, and a storage medium are provided. The method includes: sending configuration information to a terminal device, where the configuration information includes information related to channel state information reference signal CSI-RS resources that are used for beam measurement on an unlicensed frequency band UFB; and sending the CSI-RS resource to the terminal device based on the configuration information, so that the terminal device performs beam measurement on the UFB based on the configuration information and the CSI-RS resource.

18 Claims, 3 Drawing Sheets

(58) Field of Classification Search
CPC ... H04B 7/0608; H04B 7/0628; H04W 24/08; H04W 72/12; H04J 11/00
See application file for complete search history.

(56) References Cited

U.S. PATENT DOCUMENTS

| | | | |
|---|---|---|---|
| 2016/0227571 A1* | 8/2016 | Baek | H04W 52/0206 |
| 2018/0192355 A1* | 7/2018 | Kim | H04W 48/12 |
| 2018/0198583 A1* | 7/2018 | Lin | H04L 5/0048 |
| 2018/0227106 A1* | 8/2018 | Kim | H04L 5/0048 |
| 2018/0287683 A1* | 10/2018 | Subramanian | H04B 7/0643 |
| 2018/0324039 A1* | 11/2018 | Jin | H04L 5/0048 |
| 2020/0296726 A1* | 9/2020 | Wu | H04W 72/12 |

FOREIGN PATENT DOCUMENTS

| | | | | |
|---|---|---|---|---|
| CN | 105451341 A | * | 6/2016 | |
| CN | 106027181 A | | 10/2016 | |
| CN | 106685500 A | | 5/2017 | |
| CN | 107113648 A | | 8/2017 | |
| CN | 107306170 A | | 10/2017 | |
| CN | 107889113 A | | 4/2018 | |
| CN | 107925494 A | | 4/2018 | |
| CN | 108632838 A | * | 10/2018 | H04B 7/022 |
| EP | 3 267 643 A1 | | 1/2018 | |
| WO | 2015/188164 A1 | | 12/2015 | |
| WO | 2016036097 A1 | | 3/2016 | |
| WO | WO-2016036097 A1 | * | 3/2016 | H04B 7/0626 |
| WO | 2016/122254 A1 | | 8/2016 | |
| WO | 2016119325 A1 | | 8/2016 | |
| WO | 2018/062966 A1 | | 4/2018 | |
| WO | 2018/064327 A1 | | 4/2018 | |
| WO | WO-2018064327 A1 | * | 4/2018 | H04B 7/024 |
| WO | 2018/085601 A1 | | 5/2018 | |
| WO | WO-2018232090 A1 | * | 12/2018 | H04B 7/0626 |

OTHER PUBLICATIONS

CN Office Action in Application No. 201810651975.9 dated Sep. 1, 2020.
CN Office Action in Application No. 201810651975.9 dated Dec. 9, 2020.
CN Office Action in Application No. 201810651975.9 dated Mar. 11, 2020.
"Design of LAA DRS", 3GPP TSG RAN WG1 Meeting #82, R1-153923, CATT, Aug. 24, 2015.
"Measurement based on CSI-RS for L3 mobility", 3GPP TSG RAN WG1#89, R1-1707935, Samsung, May 15, 2017.
"Remaining Details of TRS Design", 3GPP TSG RAN WG1 Meeting AH 1801, R1-1800759, Nokia, Nokia Shanghai Bell, R1-1800759.
Written Opinion and International Search Report in Application No. PCT/CN2019/090815 dated Dec. 30, 2020.
EP Search Report in Application No. 19821517.0 dated Jul. 16, 2021.

* cited by examiner

BEAM MEASUREMENT METHOD, NETWORK-SIDE DEVICE, TERMINAL DEVICE, AND STORAGE MEDIUM

CROSS-REFERENCE TO RELATED APPLICATIONS

This application is a continuation application of PCT International Application No. PCT/CN2019/090815 filed on Jun. 12, 2019, which claims priority to Chinese Patent Application No. 201810651975.9, filed in China on Jun. 22, 2018, both disclosures of which are incorporated herein by reference in their entireties.

TECHNICAL FIELD

This disclosure relates to the field of communications technologies, and in particular, to a beam measurement method, a network-side device, a terminal device, and a storage medium.

BACKGROUND

Wireless spectrum resources are uniformly allocated by the state for use. The wireless spectrum is divided into two parts: licensed frequency bands (LFB) and unlicensed frequency bands (UFB). In future communications systems, the UFBs can be used as a supplement to the LFBs to help operators expand their services.

Currently, in case of an LFB, beams are used for data transmission, and beam measurement is required before a beam is used to transmit data. If beams are used for data transmission in case of a UFB, beam measurement is also required before a beam is used to transmit data. An existing beam measurement method for an LFB may be used to perform beam measurement for a UFB. However, a data transmission mechanism for a UFB is different from that for an LFB. For most UFBs, a listen before talk (LBT) mechanism is used. If the existing beam measurement method for an LFB is used to perform beam measurement for a UFB, more LBT procedures are expected before the beam measurement, leading to higher system overheads.

SUMMARY

Embodiments of this disclosure provide a beam measurement method, a network-side device, a terminal device, and a storage medium, to resolve the problems of a large quantity of LBT procedures before beam measurement and high system overheads.

According to a first aspect, an embodiment of this disclosure provides a beam measurement method, including:
sending configuration information to a terminal device, where the configuration information includes information related to channel state information-reference signal (CSI-RS) resources that are used for beam measurement on a UFB; and
sending a CSI-RS resource to the terminal device based on the configuration information, so that the terminal device performs beam measurement on the UFB based on the configuration information and the CSI-RS resource.

According to a second aspect, an embodiment of this disclosure provides a beam measurement method, including:
receiving configuration information and a CSI-RS resource from a network-side device, where the configuration information includes information related to CSI-RS resources that are used for beam measurement on a UFB; and
performing beam measurement on the UFB based on the configuration information and the CSI-RS resource.

According to a third aspect, an embodiment of this disclosure provides a network-side device, including:
a first sending module, configured to send configuration information to a terminal device, where the configuration information includes information related to CSI-RS resources that are used for beam measurement on a UFB; and
a second sending module, configured to send a CSI-RS resource to the terminal device based on the configuration information, so that the terminal device performs beam measurement on the UFB based on the configuration information and the CSI-RS resource.

According to a fourth aspect, an embodiment of this disclosure provides a terminal device, including:
a receiving module, configured to receive configuration information and a CSI-RS resource from a network-side device, where the configuration information includes information related to CSI-RS resources that are used for beam measurement on a UFB; and
a measurement module, configured to perform beam measurement on the UFB based on the configuration information and the CSI-RS resource.

According to a fifth aspect, an embodiment of this disclosure provides a network-side device, including a memory, a processor, and a program that is stored in the memory and capable of running on the processor, where
when the processor executes the program, the beam measurement method provided in the first aspect of the embodiments of this disclosure is implemented.

According to a sixth aspect, an embodiment of this disclosure provides a terminal device, including a memory, a processor, and a program that is stored in the memory and capable of running on the processor, where
when the processor executes the program, the beam measurement method provided in the second aspect of the embodiments of this disclosure is implemented.

According to a seventh aspect, an embodiment of this disclosure provides a computer-readable storage medium, where the computer-readable storage medium stores a program, and when the program is executed by a processor, the beam measurement method provided in the first aspect of the embodiments of this disclosure is implemented, or the beam measurement method provided in the second aspect of the embodiments of this disclosure is implemented.

Based on the beam measurement method, the network-side device, the terminal device, and the storage medium provided in the embodiments of this disclosure, the network-side device sends the configuration information and the CSI-RS resource to the terminal device, where the configuration information includes the information related to CSI-RS resources that are used for beam measurement on a UFB. The terminal device performs beam measurement on the UFB based on the configuration information and the CSI-RS resource. This can reduce a quantity of LBT procedures before the beam measurement and reduce system overheads.

BRIEF DESCRIPTION OF DRAWINGS

To describe the technical solutions in embodiments of this disclosure more clearly, the following briefly describes the accompanying drawings required for describing the embodiments of this disclosure. A person of ordinary skill in the art may derive other drawings from these accompanying drawings without creative efforts.

DESCRIPTION OF EMBODIMENTS

Features and exemplary embodiments of various aspects of this disclosure are described in detail below. To make the objectives, technical solutions, and advantages of this disclosure clearer and more comprehensible, the following further describes this disclosure in detail with reference to the accompanying drawings and embodiments. It should be understood that the specific embodiments described herein are only intended to explain this disclosure, and but not intended to limit this disclosure. For a person skilled in the art, this disclosure can be implemented without some of these specific details. The following descriptions of the embodiments are only to provide a better understanding for this disclosure by showing examples of this disclosure.

It should be noted that in this specification, relational terms such as first and second are only used to distinguish one entity or operation from another, and do not necessarily require or imply that any actual relationship or sequence exists between these entities or operations. Moreover, the terms "include" and "comprise", or any of their variants are intended to cover a non-exclusive inclusion, so that a process, method, article, or device that includes a list of elements not only includes those elements but also includes other elements that are not expressly listed, or further includes elements inherent to such process, method, article, or device. Without being subject to further limitations, an element defined by a phrase "including a . . . " does not exclude presence of other identical elements in the process, method, article, or device that includes the very element.

Currently, in case of an LFB, beams are used for data transmission, and beam measurement is required before a beam is used to transmit data. If beams are used for data transmission in case of a UFB, beam measurement is also required before a beam is used to transmit data. An existing beam measurement method for an LFB may be used to perform beam measurement for a UFB. However, a data transmission mechanism for a UFB is different from that for an LFB. For most UFBs, an LBT mechanism is used. If the existing beam measurement method for an LFB is used to perform beam measurement for a UFB, more LBT procedures are expected before the beam measurement, leading to higher system overheads. Based on this, the embodiments of this disclosure provide a beam measurement method, a network-side device, a terminal device, and a storage medium, to reduce a quantity of LBT procedures before beam measurement and reduce system overheads. The following first describes the beam measurement method provided in the embodiments of this disclosure.

Figure 1:
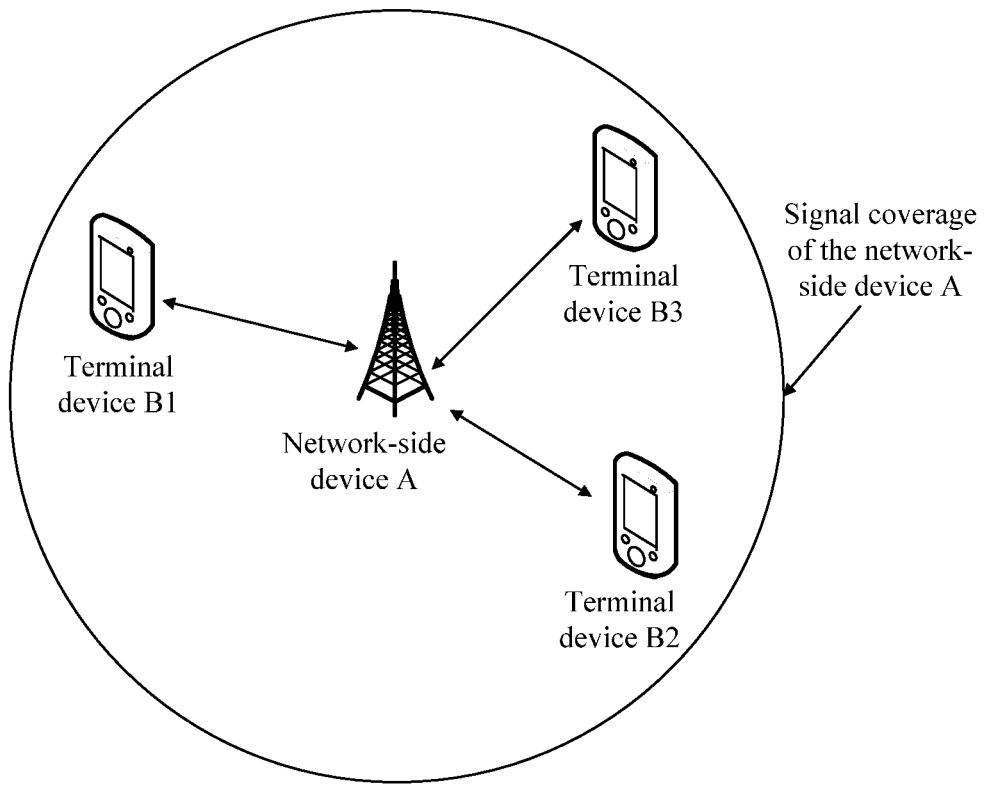
FIG. 1 is a schematic diagram of a scenario according to an embodiment of this disclosure.

FIG. 1 is a schematic diagram of a scenario according to an embodiment of this disclosure. As shown in FIG. 1, there are three terminal devices in signal coverage of a network-side device A, namely, a terminal device B1, a terminal device B2, and a terminal device B3. The network-side device A can perform uplink communication and downlink communication with every terminal device. The network-side device A provided in this embodiment of this disclosure may be a base station, where the base station may be a commonly used base station, or may be an evolved node base station (eNB), or may be a network-side device (for example, a next generation node base station (gNB) or a transmission and reception point (TRP)), a cell, or the like in a fifth-generation (5G) mobile communications system, or a network-side device in a later evolved communications system. However, the terms do not constitute a limitation on the protection scope of this disclosure. In some embodiments, the terminal device may be a mobile phone, a tablet computer, a smartwatch, a smart home appliance, or the like. This is not limited in this embodiment of this disclosure.

Figure 2:
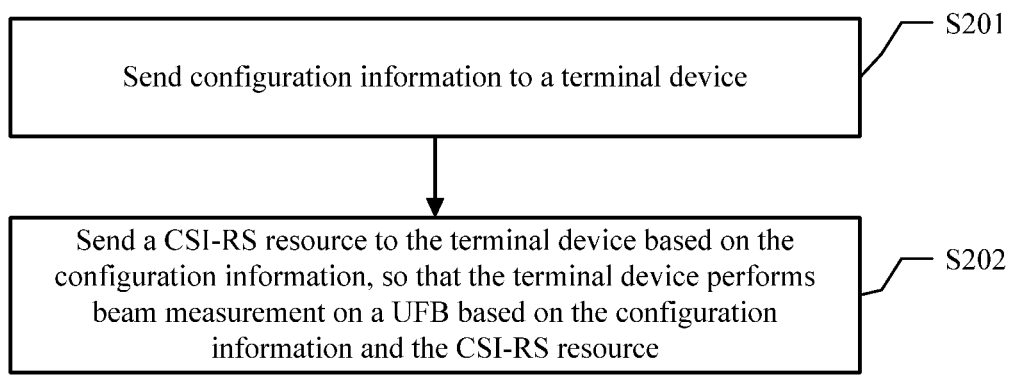
FIG. 2 is a schematic flowchart of a beam measurement method applied to a network-side device according to an embodiment of this disclosure.

An embodiment of this disclosure provides a beam measurement method applied to a network-side device, as shown in FIG. 2. FIG. 2 is a schematic flowchart of a beam measurement method applied to a network-side device according to an embodiment of this disclosure. The beam measurement method applied to a network-side device may include steps S201 and S202.

S201: Send configuration information to a terminal device.

The configuration information includes information related to CSI-RS resources that are used for beam measurement on a UFB.

A reference signal (RS) is a known signal that is provided by a transmit end for a receive end for channel estimation or channel detection.

Uplink RSs include a demodulation reference signal (DMRS) and a sounding reference signal (SRS).

Downlink RSs include a synchronization signal (SS), a cell-specific reference signal/common reference signal (CRS), a multimedia broadcast multicast service single frequency network reference signal (MBSFN RS), a mobile station specific reference signal (UE-specific RS), a positioning reference signal (PRS), and channel state information-reference signal (CSI-RS).

It can be understood that before sending, to the terminal device, the configuration information including the information related to CSI-RS resources that are used for beam measurement on a UFB, it is necessary to configure the information related to CSI-RS resources that are used for beam measurement. In some embodiments of this disclosure, radio resource control (RRC) signaling may be used to configure the information related to CSI-RS resources that are used for beam measurement on a UFB.

RRC allocates radio resources and sends related signaling. A majority of control signaling between the terminal device and the network-side device is RRC messages. The RRC messages carry all parameters that are needed to establish, modify, and release protocol entities on a MAC layer and a physical layer.

In some embodiments of this disclosure, each CSI-RS resource in a CSI-RS resource set may be configured to have at least one slot offset. Based on this, the information related to CSI-RS resources that are used for beam measurement on a UFB may include that the CSI-RS resource has at least one slot offset, where the CSI-RS resource belongs to the CSI-RS resource set.

It can be understood that because each CSI-RS resource has at least one slot offset, the CSI-RS resource can be transmitted in a plurality of slots.

In some embodiments of this disclosure, a time-domain transmission mode of the CSI-RS resource can also be configured. Based on this, the information related to CSI-RS resources that are used for beam measurement on a UFB may further include the time-domain transmission mode of the CSI-RS resource.

In some embodiments of this disclosure, the time-domain transmission mode of the CSI-RS resource is any one of the following items: a periodic mode, an aperiodic mode, and a semi-persistent mode.

In some embodiments of this disclosure, at least one CSI-RS resource may be configured to be associated with one synchronization signal block (SSB) resource. Based on this, the information related to CSI-RS resources that are used for beam measurement on a UFB may include that at least one CSI-RS resource is associated with one SSB resource.

The synchronization signal is a signal that provides a same time reference for devices that need to process information synchronously. This means that a plurality of signal sources are sent at the same time on a same carrier, enabling a receiver to receive more or better information.

In some embodiments of this disclosure, the CSI-RS resource belongs to a CSI-RS resource set; and the at least one CSI-RS resource may include: all or some CSI-RS resources in the CSI-RS resource set.

In some embodiments of this disclosure, the at least one CSI-RS resource may be configured to be in a same discovery reference signal (DRS) slot as the SSB resource, where a DRS may also be referred to as a discovery signal. Based on this, that at least one CSI-RS resource is associated with one SSB resource may include that the at least one CSI-RS resource is in a same DRS slot as the SSB resource.

One SSB resource corresponds to four symbols. If the SSB resource includes only a primary synchronization signal (PSS) and a secondary synchronization signal (SSS), in some embodiments of this disclosure, the at least one CSI-RS resource may be configured on another resource element (RE) of a symbol on which the PSS or the SSS is located. Based on this, that at least one CSI-RS resource is associated with one SSB resource may include that the at least one CSI-RS resource is located on another RE of the symbol on which the PSS or the SSS is located.

The RE refers to a subcarrier in frequency domain and a symbol in time domain. Sub-carriers constitute a multi-carrier modulation scheme for orthogonal frequency division multiplexing (OFDM). This scheme divides one carrier into many narrower-band sub-carriers. The sub-carriers are orthogonal to each other, and fast Fourier transform is used to encode these sub-carrier signals. Each symbol corresponds to one orthogonal sub-carrier.

One SSB resource corresponds to four symbols. If the SSB resource includes only a PSS and an SSS, in some embodiments of this disclosure, the at least one CSI-RS resource may alternatively be configured to be located on an RE on which an original physical broadcast channel (PBCH) of the SSB resource Based on this, that at least one CSI-RS resource is associated with one SSB resource may include that the at least one CSI-RS resource is located on an RE on which the original PBCH in the SSB resource is located.

One SSB resource corresponds to four symbols. If the SSB resource includes only a PSS and an SSS, in some embodiments of this disclosure, the at least one CSI-RS resource may alternatively be configured to be located on another RE of a symbol on which the original PBCH in the SSB resource is located. Based on this, that at least one CSI-RS resource is associated with one SSB resource may include that the at least one CSI-RS resource is located on another RE of a symbol on which the original PBCH in the SSB resource is located.

In some embodiments of this disclosure, the at least one CSI-RS resource may alternatively be configured on another RE of a symbol on which the SSB resource is located. Based on this, that at least one CSI-RS resource is associated with one SSB resource may include that the at least one CSI-RS resource is located on another RE of a symbol on which the original PBCH in the SSB resource is located.

In some embodiments of this disclosure, if there is another downlink symbol after the SSB resource in a slot in which the SSB resource is located, the at least one CSI-RS resource may be configured to be located on the another downlink symbol, or the at least one CSI-RS resource may be configured to be located on a downlink symbol in another slot after the slot in which the SSB resource is located. Based on this, that at least one CSI-RS resource is associated with one SSB resource may include that the at least one CSI-RS resource is located on another downlink symbol, or that the at least one CSI-RS resource is located on a downlink symbol in another slot after the slot in which the SSB resource is located.

In some embodiments of this disclosure, if there is no other downlink symbol after the SSB resource in a slot in which the SSB resource is located, the at least one CSI-RS resource may be configured to be located on a downlink symbol in another slot after the slot in which the SSB resource is located. Based on this, that at least one CSI-RS resource is associated with one SSB resource may include that the at least one CSI-RS resource is located on a downlink symbol in another slot after the slot in which the SSB resource is located.

In some embodiments of this disclosure, alternatively, at least one CSI-RS resource may be configured to be associated with one tracking reference signal (TRS) resource. Based on this, the information related to CSI-RS resources that are used for beam measurement on a UFB includes that at least one CSI-RS resource is associated with one TRS resource.

In some embodiments of this disclosure, the TRS resource may be configured to be located on a same symbol as one SSB resource, or the TRS resource may be configured to be associated with one SSB resource but the TRS resource and the SSB resource are located on different symbols. Based on this, the information related to CSI-RS resources that are used for beam measurement on a UFB may further include that the TRS resource is located on a same symbol as one SSB resource, or that the TRS resource is associated with one SSB resource and the TRS resource and the SSB resource are located on different symbols.

In some embodiments of this disclosure, a sub-time unit in the configuration information is less than one symbol. The sub-time unit is a time unit used to measure link quality of a beam pair formed by a transmit beam and a receive beam. When the sub-time unit in the configuration information is less than one symbol, the terminal device can measure a plurality of CSI-RS resources within one symbol, thereby improving the speed of beam measurement.

S202: Send a CSI-RS resource to the terminal device based on the configuration information, so that the terminal device performs beam measurement on the UFB based on the configuration information and the CSI-RS resource.

In some embodiments of this disclosure, the sending a CSI-RS resource to the terminal device based on the configuration information may include: sending the SSB resource and the CSI-RS resource associated with the SSB resource to the terminal device.

In some embodiments of this disclosure, if the at least one CSI-RS resource uses a same LBT measurement result as the SSB resource and the LBT measurement result is that a current channel state is idle, the network-side device may send the SSB resource, and then may send the CSI-RS resource associated with the SSB resource. Based on this, the sending the SSB resource and the CSI-RS resource associated with the SSB resource to the terminal device may include: if the at least one CSI-RS resource uses a same LBT measurement result as the SSB resource and the LBT measurement result is that the current channel state is idle, sending the SSB resource and the CSI-RS resource associated with the SSB resource to the terminal device.

In some embodiments of this disclosure, the time-domain transmission mode of the CSI-RS resource is the semi-persistent mode; and the beam measurement method provided in this embodiment of this disclosure may further include:

sending a media access control (MAC) control element (CE) command to the terminal device, so that the terminal device activates the CSI-RS resource according to the MAC CE command.

In some embodiments of this disclosure, the time-domain transmission mode of the CSI-RS resource is the aperiodic mode; and the beam measurement method provided in this embodiment of this disclosure may further include:

sending physical layer signaling to the terminal device to trigger the CSI-RS resource set to which the CSI-RS resource belongs.

In this case, after receiving the physical layer signaling sent by the network-side device, the terminal device can trigger, at one time, a CSI-RS resource set to which a CSI-RS resource with a plurality of different offsets belongs, and can further use the CSI-RS resource with the plurality of different offsets to perform beam measurement on the UFB.

In some embodiments of this disclosure, the sending physical layer signaling to the terminal device may include:

sending group common downlink control information (DCI) or an uplink grant (UL-grant) signaling field to the terminal device to trigger the CSI-RS resource set to which the CSI-RS resource belongs.

The DCI is carried by a physical downlink control channel (PDCCH). The DCI sent by the network-side device to the terminal device includes: uplink and downlink resource allocation, hybrid automatic repeat request (HARQ) information, power control, and the like. The group common DCI (or called non-scheduling DCI) is carried by a non-scheduling PDCCH, and the UL-grant signaling field is located in scheduling DCI and carried by a scheduling PDCCH.

In some embodiments of this disclosure, a new DCI format may be used for the group common DCI, so that the group common DCI carries a signaling field used for triggering an aperiodic CSI-RS resource, that is, the DCI may include the signaling field used for triggering the aperiodic CSI-RS resource.

According to the beam measurement method provided in this embodiment of this disclosure, the network-side device sends the configuration information and the CSI-RS resource to the terminal device, where the configuration information includes the information related to CSI-RS resources that are used for beam measurement on a UFB; and the terminal device performs beam measurement on the UFB based on the configuration information and the CSI-RS resource. This can reduce a quantity of LBT procedures before the beam measurement and reduce system overheads.

Figure 3:
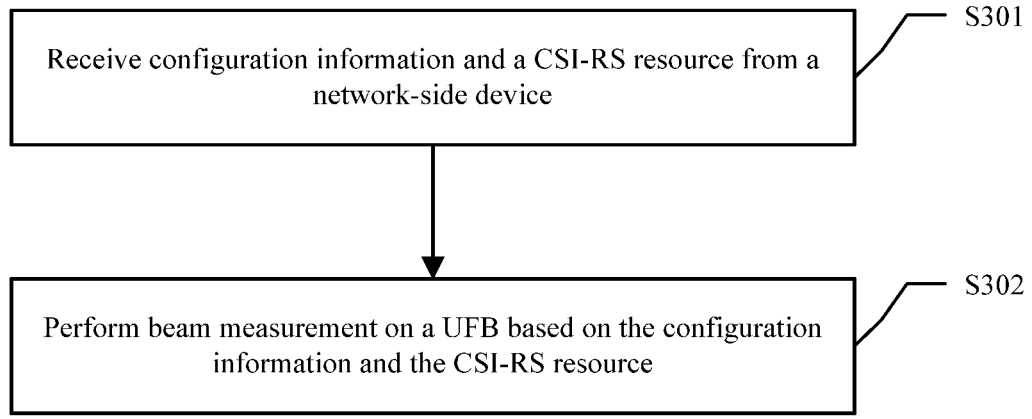
FIG. 3 is a schematic flowchart of a beam measurement method applied to a terminal device according to an embodiment of this disclosure.

An embodiment of this disclosure provides a beam measurement method applied to a terminal device. FIG. 3 is a schematic flowchart of a beam measurement method applied to a terminal device according to an embodiment of this disclosure. The beam measurement method applied to a terminal device may include steps S301 and S302.

S301: Receive configuration information and a CSI-RS resource from a network-side device.

The configuration information may include information related to CSI-RS resources that are used for beam measurement on a UFB.

In some embodiments of this disclosure, the information related to CSI-RS resources that are used for beam measurement on a UFB may include that: the CSI-RS resource has at least one slot offset, where the CSI-RS resource belongs to a CSI-RS resource set.

In some embodiments of this disclosure, the information related to CSI-RS resources that are used for beam measurement on a UFB may further include: a time-domain transmission mode of the CSI-RS resource.

In some embodiments of this disclosure, the time-domain transmission mode of the CSI-RS resource is any one of the following items: a periodic mode, an aperiodic mode, and a semi-persistent mode.

In some embodiments of this disclosure, the information related to CSI-RS resources that are used for beam measurement on a UFB may include that at least one CSI-RS resource is associated with one SSB resource.

In some embodiments of this disclosure, the CSI-RS resource belongs to a CSI-RS resource set; and the at least one CSI-RS resource may include: all or some CSI-RS resources in the CSI-RS resource set.

In some embodiments of this disclosure, that at least one CSI-RS resource is associated with one SSB resource may include that the at least one CSI-RS resource is in a same DRS slot as the SSB resource.

In some embodiments of this disclosure, the SSB resource includes a PSS and an SSS. That at least one CSI-RS resource is associated with one SSB resource may include that the at least one CSI-RS resource is located on another RE of a symbol on which the PSS or the SSS is located; or that the at least one CSI-RS resource is located on an RE on which an original PBCH in the SSB resource is located; or that the at least one CSI-RS resource is located on another RE of a symbol on which an original PBCH in the SSB resource is located.

In some embodiments of this disclosure, that at least one CSI-RS resource is associated with one SSB resource includes that the at least one CSI-RS resource is located on another RE of a symbol on which the SSB resource is located.

In some embodiments of this disclosure, there is another downlink symbol after the SSB resource in a slot in which the SSB resource is located, and that at least one CSI-RS resource is associated with one SSB resource may include that the at least one CSI-RS resource is located on the another downlink symbol, or that the at least one CSI-RS resource is located on a downlink symbol in another slot after the slot in which the SSB resource is located.

In some embodiments of this disclosure, there is no other downlink symbol after the SSB resource in a slot in which the SSB resource is located, and that at least one CSI-RS resource is associated with one SSB resource may include that the at least one CSI-RS resource is located on a downlink symbol in another slot after the slot in which the SSB resource is located.

In some embodiments of this disclosure, the information related to CSI-RS resources that are used for beam measurement on a UFB includes that at least one CSI-RS resource is associated with one TRS resource.

In some embodiments of this disclosure, the information related to CSI-RS resources that are used for beam measurement on a UFB may further include that the TRS resource is located on a same symbol as one SSB resource, or that the TRS resource is associated with one SSB resource and the TRS resource and the SSB resource are located on different symbols.

In some embodiments of this disclosure, a sub-time unit in the configuration information is less than one symbol. The sub-time unit is a time unit used to measure link quality of a beam pair formed by a transmit beam and a receive beam. When the sub-time unit in the configuration information is less than one symbol, the terminal device can measure a plurality of CSI-RS resources within one symbol, thereby improving the speed of beam measurement.

S302: Perform beam measurement on the UFB based on the configuration information and the CSI-RS resource.

In some embodiments of this disclosure, the time-domain transmission mode of the CSI-RS resource is the semi-persistent mode; and the beam measurement method provided in this embodiment of this disclosure may further include: receiving a MAC CE command from the network-side device, and activating the CSI-RS resource according to the MAC CE command.

In some embodiments of this disclosure, the time-domain transmission mode of the CSI-RS resource is the aperiodic mode; and the beam measurement method provided in this embodiment of this disclosure may further include: receiving physical layer signaling from the network-side device to trigger the CSI-RS resource set to which the CSI-RS resource belongs.

In this case, after receiving the physical layer signaling from the network-side device, the terminal device can trigger, at one time, a CSI-RS resource set to which a CSI-RS resource with a plurality of different offsets belongs, and can further use the CSI-RS resource with the plurality of different offsets to perform beam measurement on the UFB.

In some embodiments of this disclosure, the receiving physical layer signaling from the network-side device to trigger the CSI-RS resource set to which the CSI-RS resource belongs may include: receiving group common DCI or a UL-grant signaling field from the network-side device to trigger the CSI-RS resource set to which the CSI-RS resource belongs. The group common DCI is carried by a non-scheduling PDCCH, and the UL-grant signaling field is located in scheduling DCI and carried by a scheduling PDCCH.

In some embodiments of this disclosure, a new DCI format may be used for the group common DCI, so that the group common DCI carries a signaling field used for triggering an aperiodic CSI-RS resource, that is, the DCI may include a signaling field used for triggering the aperiodic CSI-RS resource.

In some embodiments of this disclosure, the beam measurement method provided in this embodiment of this disclosure may further include: using an average of at least one measurement result of one CSI-RS resource as a final beam measurement result of the CSI-RS resource, or selecting one measurement result from the at least one measurement result as the final beam measurement result of the CSI-RS resource. To be specific, for a CSI-RS resource with a plurality of slot offsets, an average of measurement results of the CSI-RS resource in a plurality of slots is used as a final beam measurement result of the CSI-RS resource, or one measurement result is selected from the measurement results of the CSI-RS resource in the plurality of slots as the final beam measurement result of the CSI-RS resource.

According to the beam measurement method provided in this embodiment of this disclosure, the terminal device receives the configuration information and CSI-RS resource sent by the network-side device, and performs beam measurement on the UFB based on the configuration information and the CSI-RS resource. This can reduce a quantity of LBT procedures before the beam measurement and reduce system overheads.

Figure 4:
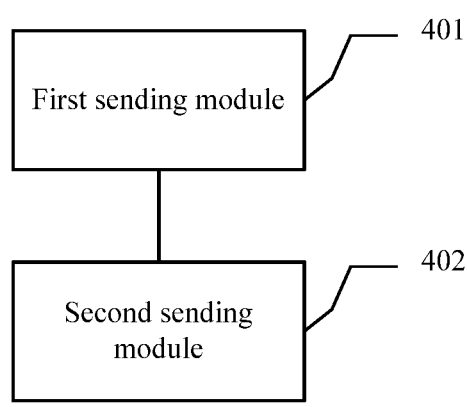
FIG. 4 is a schematic structural diagram of a network-side device according to an embodiment of this disclosure.

Corresponding to the embodiment of the beam measurement method applied to a network-side device shown in FIG. 2, an embodiment of this disclosure further provides a network-side device. FIG. 4 is a schematic structural diagram of a network-side device according to an embodiment of this disclosure. The network-side device may include the following modules.

A first sending module 401 is configured to send configuration information to a terminal device. The configuration information includes information related to CSI-RS resources that are used for beam measurement on a UFB.

In some embodiments of this disclosure, the information related to CSI-RS resources that are used for beam measurement on a UFB may include that: the CSI-RS resource has at least one slot offset, where the CSI-RS resource belongs to a CSI-RS resource set.

In some embodiments of this disclosure, the information related to CSI-RS resources that are used for beam measurement on a UFB may further include: a time-domain transmission mode of the CSI-RS resource.

In some embodiments of this disclosure, the time-domain transmission mode of the CSI-RS resource is any one of the following items: a periodic mode, an aperiodic mode, and a semi-persistent mode.

In some embodiments of this disclosure, the information related to CSI-RS resources that are used for beam measurement on a UFB may include that at least one CSI-RS resource is associated with one SSB resource.

In some embodiments of this disclosure, the CSI-RS resource belongs to a CSI-RS resource set; and the at least one CSI-RS resource includes: all or some CSI-RS resources in the CSI-RS resource set.

In some embodiments of this disclosure, that at least one CSI-RS resource is associated with one SSB resource may include that the at least one CSI-RS resource is in a same DRS slot as the SSB resource.

In some embodiments of this disclosure, the SSB resource includes a PSS and an SSS, and that at least one CSI-RS resource is associated with one SSB resource may include that the at least one CSI-RS resource is located on another RE of a symbol on which the PSS or the SSS is located; or that the at least one CSI-RS resource is located on an RE on which an original PBCH in the SSB resource is located; or that the at least one CSI-RS resource is located on another RE of a symbol on which an original PBCH in the SSB resource is located.

In some embodiments of this disclosure, that at least one CSI-RS resource is associated with one SSB resource includes that the at least one CSI-RS resource is located on another RE of a symbol on which the SSB resource is located.

In some embodiments of this disclosure, there is another downlink symbol after the SSB resource in a slot in which the SSB resource is located, and that at least one CSI-RS resource is associated with one SSB resource may include that the at least one CSI-RS resource is located on the another downlink symbol, or that the at least one CSI-RS resource is located on a downlink symbol in another slot after the slot in which the SSB resource is located.

In some embodiments of this disclosure, there is no other downlink symbol after the SSB resource in a slot in which the SSB resource is located, and that at least one CSI-RS resource is associated with one SSB resource may include that the at least one CSI-RS resource is located on a downlink symbol in another slot after the slot in which the SSB resource is located.

In some embodiments of this disclosure, the information related to CSI-RS resources that are used for beam measurement on a UFB includes that at least one CSI-RS resource is associated with one TRS resource.

In some embodiments of this disclosure, the information related to CSI-RS resources that are used for beam measurement on a UFB may further include that the TRS resource is located on a same symbol as one SSB resource, or that the TRS resource is associated with one SSB resource and the TRS resource and the SSB resource are located on different symbols.

In some embodiments of this disclosure, a sub-time unit in the configuration information is less than one symbol. The sub-time unit is a time unit used to measure link quality of a beam pair formed by a transmit beam and a receive beam. When the sub-time unit in the configuration information is less than one symbol, the terminal device can measure a plurality of CSI-RS resources within one symbol, thereby improving the speed of beam measurement.

A second sending module 402 is configured to send a CSI-RS resource to the terminal device based on the configuration information, so that the terminal device performs beam measurement on the UFB based on the configuration information and the CSI-RS resource.

In some embodiments of this disclosure, the second sending module 402 may be specifically configured to send the SSB resource and the CSI-RS resource associated with the SSB resource to the terminal device.

In some embodiments of this disclosure, the second sending module 402 may be specifically configured to: if the at least one CSI-RS resource uses a same LBT measurement result as the SSB resource and the LBT measurement result is that a current channel state is idle, send the SSB resource and the CSI-RS resource associated with the SSB resource to the terminal device.

In some embodiments of this disclosure, the time-domain transmission mode of the CSI-RS resource is the semi-persistent mode; and the network-side device provided in this embodiment of this disclosure may further include:

a third sending module (not shown in the figure), configured to send a MAC CE command to the terminal device, so that the terminal device activates the CSI-RS resource according to the MAC CE command.

In some embodiments of this disclosure, the time-domain transmission mode of the CSI-RS resource is the aperiodic mode; and the network-side device provided in this embodiment of this disclosure may further include:

a fourth sending module (not shown in the figure), configured to send group common DCI or a UL-grant signaling field to the terminal device to trigger the CSI-RS resource set to which the CSI-RS resource belongs. The group common DCI is carried by a non-scheduling PDCCH, and the UL-grant signaling field is carried by a scheduling PDCCH.

In some embodiments of this disclosure, a new DCI format may be used for the group common DCI, so that the group common DCI carries a signaling field used for triggering an aperiodic CSI-RS resource, that is, the DCI may include a signaling field used for triggering the aperiodic CSI-RS resource.

According to the network-side device provided in this embodiment of this disclosure, the network-side device sends the configuration information and the CSI-RS resource to the terminal device, where the configuration information includes the information related to CSI-RS resources that are used for beam measurement on a UFB; and the terminal device performs beam measurement on the UFB based on the configuration information and the CSI-RS resource. This can reduce a quantity of LBT procedures before the beam measurement and reduce system overheads.

Figure 5:
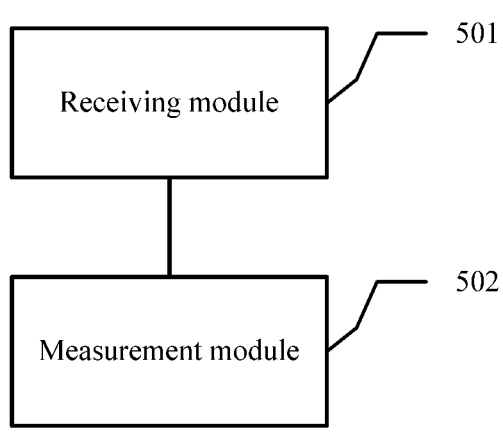
FIG. 5 is a schematic structural diagram of a terminal device according to an embodiment of this disclosure.

Corresponding to the embodiment of the beam measurement method applied to a terminal device shown in FIG. 3, an embodiment of this disclosure further provides a terminal device. FIG. 5 is a schematic structural diagram of a terminal device according to an embodiment of this disclosure. The terminal device may include the following modules.

A receiving module 501 is configured to receive configuration information and a CSI-RS resource from a network-side device.

The configuration information includes information related to CSI-RS resources that are used for beam measurement on a UFB.

In some embodiments of this disclosure, the information related to CSI-RS resources that are used for beam measurement on a UFB may include that: the CSI-RS resource has at least one slot offset, where the CSI-RS resource belongs to a CSI-RS resource set.

In some embodiments of this disclosure, the information related to CSI-RS resources that are used for beam measurement on a UFB may further include: a time-domain transmission mode of the CSI-RS resource.

In some embodiments of this disclosure, the time-domain transmission mode of the CSI-RS resource is any one of the following items: a periodic mode, an aperiodic mode, and a semi-persistent mode.

In some embodiments of this disclosure, the information related to CSI-RS resources that are used for beam measurement on a UFB may include that: at least one CSI-RS resource is associated with one SSB resource.

In some embodiments of this disclosure, the CSI-RS resource belongs to a CSI-RS resource set; and the at least one CSI-RS resource includes: all or some CSI-RS resources in the CSI-RS resource set.

In some embodiments of this disclosure, that at least one CSI-RS resource is associated with one SSB resource may include that the at least one CSI-RS resource is in a same DRS slot as the SSB resource.

In some embodiments of this disclosure, the SSB resource includes a PSS and an SSS, and that at least one CSI-RS resource is associated with one SSB resource may include that the at least one CSI-RS resource is located on another RE of a symbol on which the PSS or the SSS is located; or that the at least one CSI-RS resource is located on an RE on which an original PBCH in the SSB resource is located; or that the at least one CSI-RS resource is located on another RE of a symbol on which an original PBCH in the SSB resource is located.

In some embodiments of this disclosure, that at least one CSI-RS resource is associated with one SSB resource includes that the at least one CSI-RS resource is located on another RE of a symbol on which the SSB resource is located.

In some embodiments of this disclosure, there is another downlink symbol after the SSB resource in a slot in which the SSB resource is located, and that at least one CSI-RS resource is associated with one SSB resource may include that the at least one CSI-RS resource is located on the another downlink symbol, or that the at least one CSI-RS resource is located on a downlink symbol in another slot after the slot in which the SSB resource is located.

In some embodiments of this disclosure, there is no other downlink symbol after the SSB resource in a slot in which the SSB resource is located, and that at least one CSI-RS resource is associated with one SSB resource may include that the at least one CSI-RS resource is located on a downlink symbol in another slot after the slot in which the SSB resource is located.

In some embodiments of this disclosure, the information related to CSI-RS resources that are used for beam measurement on a UFB includes that at least one CSI-RS resource is associated with one TRS resource.

In some embodiments of this disclosure, the information related to CSI-RS resources that are used for beam measurement on a UFB may further include that the TRS resource is located on a same symbol as one SSB resource, or that the TRS resource is associated with one SSB resource and the TRS resource and the SSB resource are located on different symbols.

In some embodiments of this disclosure, a sub-time unit in the configuration information is less than one symbol. The sub-time unit is a time unit used to measure link quality of a beam pair formed by a transmit beam and a receive beam. When the sub-time unit in the configuration information is less than one symbol, the terminal device can measure a plurality of CSI-RS resources within one symbol, thereby improving the speed of beam measurement.

A measurement module 502 is configured to perform beam measurement on the UFB based on the configuration information and the CSI-RS resource.

In some embodiments of this disclosure, the time-domain transmission mode of the CSI-RS resource is the semi-persistent mode; and the receiving module 501 of this embodiment of this disclosure may further be configured to: receive a MAC CE command from the network-side device, and activate the CSI-RS resource according to the MAC CE command.

In some embodiments of this disclosure, the time-domain transmission mode of the CSI-RS resource is the aperiodic mode; and the receiving module 501 of this embodiment of this disclosure may further be configured to: receive physical layer signaling from the network-side device to trigger the CSI-RS resource set to which the CSI-RS resource belongs.

In some embodiments of this disclosure, the receiving module 501 of this embodiment of this disclosure may be specifically configured to: receive group common DCI or a UL-grant signaling field from the network-side device to trigger the CSI-RS resource set to which the CSI-RS resource belongs. The group common DCI is carried by a non-scheduling PDCCH, and the UL-grant signaling field is carried by a scheduling PDCCH.

In some embodiments of this disclosure, a new DCI format may be used for the group common DCI, so that the group common DCI carries a signaling field used for triggering an aperiodic CSI-RS resource, that is, the DCI may include a signaling field used for triggering the aperiodic CSI-RS resource.

In some embodiments of this disclosure, the terminal device provided in this embodiment of this disclosure may further include a determining module (not shown in the figure), configured to: use an average of at least one measurement result of one CSI-RS resource as a final beam measurement result of the CSI-RS resource, or select one measurement result from the at least one measurement result as the final beam measurement result of the CSI-RS resource.

According to the terminal device provided in this embodiment of this disclosure, the terminal device receives the configuration information and CSI-RS resource sent by the network-side device, and performs beam measurement on the UFB based on the configuration information and the CSI-RS resource. This can reduce a quantity of LBT procedures before the beam measurement and reduce system overheads.

Figure 6:
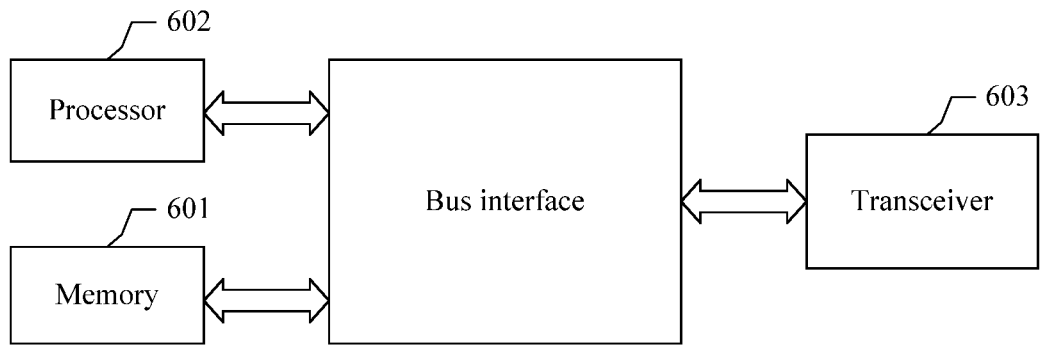
FIG. 6 is a schematic structural diagram of hardware of a network-side device according to an embodiment of this disclosure.

FIG. 6 is a schematic structural diagram of hardware of a network-side device according to an embodiment of this disclosure. The network-side device includes a memory 601, a processor 602, a transceiver 603, and a program that is stored in the memory 601 and capable of running on the processor 602.

The processor 602 may be configured to: send configuration information to a terminal device, where the configuration information includes information related to CSI-RS resources that are used for beam measurement on a UFB; and send a CSI-RS resource to the terminal device based on the configuration information, so that the terminal device performs beam measurement on the UFB based on the configuration information and the CSI-RS resource.

In some embodiments of this disclosure, the information related to CSI-RS resources that are used for beam measurement on a UFB may include that: the CSI-RS resource has at least one slot offset, where the CSI-RS resource belongs to a CSI-RS resource set.

In some embodiments of this disclosure, the information related to CSI-RS resources that are used for beam measurement on a UFB may further include: a time-domain transmission mode of the CSI-RS resource.

In some embodiments of this disclosure, the time-domain transmission mode of the CSI-RS resource is any one of the following items: a periodic mode, an aperiodic mode, and a semi-persistent mode.

In some embodiments of this disclosure, the time-domain transmission mode of the CSI-RS resource is the semi-persistent mode; and the processor 602 may further be configured to send a MAC CE command to the terminal device, so that the terminal device activates the CSI-RS resource according to the MAC CE command.

In some embodiments of this disclosure, the time-domain transmission mode of the CSI-RS resource is the aperiodic mode; and the processor 602 may further be configured to send physical layer signaling to the terminal device to trigger the CSI-RS resource set to which the CSI-RS resource belongs.

In some embodiments of this disclosure, the processor 602 may be specifically configured to send group common DCI or a UL-grant signaling field to the terminal device to trigger the CSI-RS resource set to which the CSI-RS resource belongs. The group common DCI is carried by a non-scheduling PDCCH, and the UL-grant signaling field is carried by a scheduling PDCCH.

In some embodiments of this disclosure, a new DCI format may be used for the group common DCI, so that the group common DCI carries a signaling field used for triggering an aperiodic CSI-RS resource, that is, the DCI may include a signaling field used for triggering the aperiodic CSI-RS resource.

In some embodiments of this disclosure, the information related to CSI-RS resources that are used for beam measurement on a UFB may include that: at least one CSI-RS resource is associated with one SSB resource.

In some embodiments of this disclosure, the processor 602 may be specifically configured to send the SSB resource and the CSI-RS resource associated with the SSB resource to the terminal device.

In some embodiments of this disclosure, the processor 602 may be specifically configured to: if the at least one CSI-RS resource uses a same LBT measurement result as the SSB resource and the LBT measurement result is that a current channel state is idle, send the SSB resource and the CSI-RS resource associated with the SSB resource to the terminal device.

In some embodiments of this disclosure, the CSI-RS resource belongs to a CSI-RS resource set; and the at least one CSI-RS resource includes: all or some CSI-RS resources in the CSI-RS resource set.

In some embodiments of this disclosure, that at least one CSI-RS resource is associated with one SSB resource may include that the at least one CSI-RS resource is in a same DRS slot as the SSB resource.

In some embodiments of this disclosure, the SSB resource includes a PSS and an SSS, and that at least one CSI-RS resource is associated with one SSB resource may include that the at least one CSI-RS resource is located on another RE of a symbol on which the PSS or the SSS is located; or that the at least one CSI-RS resource is located on an RE on which an original PBCH in the SSB resource is located; or that the at least one CSI-RS resource is located on another RE of a symbol on which an original PBCH in the SSB resource is located.

In some embodiments of this disclosure, that at least one CSI-RS resource is associated with one SSB resource includes that the at least one CSI-RS resource is located on another RE of a symbol on which the SSB resource is located.

In some embodiments of this disclosure, there is another downlink symbol after the SSB resource in a slot in which the SSB resource is located, and that at least one CSI-RS resource is associated with one SSB resource may include that the at least one CSI-RS resource is located on the another downlink symbol, or that the at least one CSI-RS resource is located on a downlink symbol in another slot after the slot in which the SSB resource is located.

In some embodiments of this disclosure, there is no other downlink symbol after the SSB resource in a slot in which the SSB resource is located, and that at least one CSI-RS resource is associated with one SSB resource may include that the at least one CSI-RS resource is located on a downlink symbol in another slot after the slot in which the SSB resource is located.

In some embodiments of this disclosure, the information related to CSI-RS resources that are used for beam measurement on a UFB includes that at least one CSI-RS resource is associated with one TRS resource.

In some embodiments of this disclosure, the information related to CSI-RS resources that are used for beam measurement on a UFB may further include that the TRS resource is located on a same symbol as one SSB resource, or that the TRS resource is associated with one SSB resource and the TRS resource and the SSB resource are located on different symbols.

In some embodiments of this disclosure, a sub-time unit in the configuration information is less than one symbol. The sub-time unit is a time unit used to measure link quality of a beam pair formed by a transmit beam and a receive beam. When the sub-time unit in the configuration information is less than one symbol, the terminal device can measure a plurality of CSI-RS resources within one symbol, thereby improving the speed of beam measurement.

In FIG. 6, a bus architecture may include any quantity of interconnected buses and bridges, which are specifically connected by various circuits of one or more processors represented by the processor 602 and a memory represented by the memory 601. The bus architecture may further connect various other circuits such as peripheral device, voltage stabilizer, and power management circuits. These are well known in the art, and therefore are not further described in this specification. A bus interface provides interfaces. The transceiver 603 may be a plurality of elements, including a transmitter and a receiver, providing units configured to perform communication with various other apparatuses over a transmission medium, and is configured to receive and send data under the control of the processor 602. The processor 602 is responsible for management of the bus architecture and general processing, and the memory 601 may store data for use by the processor 602 when the processor 602 performs an operation.

Optionally, an embodiment of this disclosure further provides a network-side terminal, including a processor 602, a memory 601, and a program that is stored in the memory 601 and capable of running on the processor 602, where when the program is executed by the processor 602, the procedures of the beam measurement method embodiment applied to a network-side device is implemented, with the same technical effects achieved. To avoid repetition, details are not described herein again.

Figure 7:
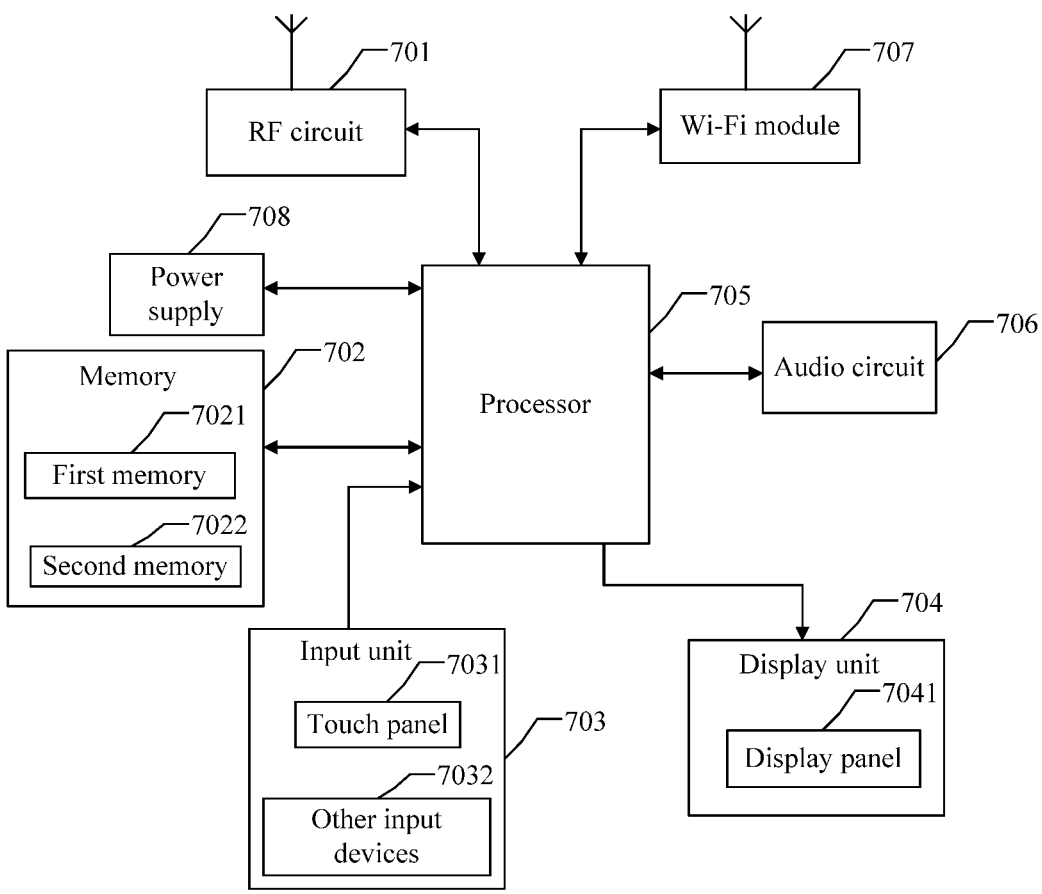
FIG. 7 is a schematic structural diagram of hardware of a terminal device according to an embodiment of this disclosure.

FIG. 7 is a schematic structural diagram of hardware of a terminal device according to an embodiment of this disclosure. The terminal device includes but is not limited to a radio frequency (RF) circuit 701, a memory 702, an input unit 703, a display unit 704, a processor 705, an audio circuit 706, a Wireless Fidelity (Wi-Fi) module 707, and a power supply 708. A person skilled in the art may understand that the terminal device is not limited to the terminal device structure shown in FIG. 7. The terminal device may include more or fewer components than those shown in the figure, or combine some of the components, or arrange the components differently. In this embodiment of this disclosure, the terminal device includes but is not limited to a mobile phone, a tablet computer, a notebook computer, a palmtop computer, an in-vehicle terminal, a wearable device, a pedometer, and the like.

The RF circuit 701 may be configured to receive and send a signal during sending and receiving information or a call process. Specifically, the RF circuit 701 sends downlink information received from a network-side device to the processor 705 for processing, and in addition, sends uplink data to the network-side device. Generally, the RF circuit 701 includes but is not limited to an antenna, at least one amplifier, a transceiver, a coupler, a low noise amplifier, a duplexer, and the like. In addition, the RF circuit 701 may also communicate with a network and other devices through a wireless communications system.

The memory 702 may be configured to store software programs and various data. The memory 702 may mainly include a program storage area and a data storage area. The program storage area may store an operating system, an application program required for at least one function (for example, a sound play function and an image play function), and the like. The data storage area may store data (for example, audio data and a phone book) created based on use of the terminal device, and the like. In addition, the memory 702 may include a high-speed random access memory, or may include a non-volatile memory, for example, at least one magnetic disk storage device, a flash memory device, or other volatile solid-state storage devices. The memory 702 may include a first memory 7021 that stores software programs and/or modules, and a second memory 7022 that stores data.

The input unit 703 may be configured to receive input digit or character information, and generate a signal input related to a user setting and function control of the terminal device. Specifically, in this embodiment of this disclosure, the input unit 703 may include a touch panel 7031. The touch panel 7031, also referred to as a touchscreen, may capture a touch operation performed by a user on or near the touch panel (for example, an operation performed by the user on the touch panel 7031 by using any appropriate object or accessory such as a finger or a stylus), and drive a corresponding connection apparatus according to a preset program. Optionally, the touch panel 7031 may include two parts: a touch detection apparatus and a touch controller. The touch detection apparatus detects a touch position of the user, detects a signal brought by a touch operation, and transmits the signal to the touch controller. The touch controller receives touch information from the touch detection apparatus, converts the touch information into point coordinates, sends the point coordinates to the processor 705, and can receive and execute a command sent by the processor 705. In addition, the touch panel 7031 may be implemented in a plurality of forms, for example, as a resistive, capacitive, infrared, or surface acoustic wave touch panel. In addition to the touch panel 7031, the input device 703 may further include other input devices 7032, and the other input devices 7032 may include but are not limited to one or more of a physical keyboard, a function key (for example, a volume control key or a power on/off key), a trackball, a mouse, a joystick, and the like.

The display unit 704 may be configured to display information input by the user, information provided for the user, and various menu interfaces of the terminal device. The display unit 704 may include the display panel 7041. Optionally, the display panel 7041 may be configured in a form of a liquid crystal display (LCD), an organic light-emitting diode (OLED), or the like.

It should be noted that the touch panel 7031 may cover the display panel 7041 to form a touchscreen. After the touchscreen detects a touch operation on or near the touchscreen, the touchscreen transmits the touch operation to the processor 705 to determine a type of a touch event. Then the processor 705 provides a corresponding visual output on the touchscreen based on the type of the touch event.

The touchscreen includes an application programming interface display area and a common control display area. An arrangement of the application programming interface display area and the common control display area is not limited. The two display areas may be arranged in an up-down direction, a left-right direction, or the like that can distinguish the two display areas. The application programming interface display area may be used to display an application programming interface. Each interface may include interface elements such as at least one application icon and/or widget desktop control. The application programming interface display area may alternatively be an empty interface that does not contain any content. The common control display area is used to display controls with a high usage rate, for example, application icons such as a setting button, an interface number, a scroll bar, and a phone book icon.

The processor 705 is a control center of the terminal device. The processor 705 uses various interfaces and lines to connect all parts of the entire terminal device, and performs various functions and data processing of the terminal device by running or executing the software program and/or module stored in the first memory 7021 and calling data stored in the second memory 7022, thereby performing overall monitoring on the terminal device. Optionally, the processor 705 may include one or more processing units.

In this embodiment of this disclosure, by calling and storing the software program and/or module in the first memory 7021 and/or the data in the second memory 7022, the processor 705 may be configured to: receive configuration information and a CSI-RS resource from a network-side device, and perform beam measurement on a UFB based on the configuration information and the CSI-RS resource, where the configuration information includes information related to CSI-RS resources that are used for beam measurement on a UFB.

In some embodiments of this disclosure, the information related to CSI-RS resources that are used for beam measurement on a UFB may include that: the CSI-RS resource has at least one slot offset, where the CSI-RS resource belongs to a CSI-RS resource set.

In some embodiments of this disclosure, the information related to CSI-RS resources that are used for beam measurement on a UFB may further include: a time-domain transmission mode of the CSI-RS resource.

In some embodiments of this disclosure, the time-domain transmission mode of the CSI-RS resource is any one of the following items: a periodic mode, an aperiodic mode, and a semi-persistent mode.

In some embodiments of this disclosure, the information related to CSI-RS resources that are used for beam measurement on a UFB may include that: at least one CSI-RS resource is associated with one SSB resource.

In some embodiments of this disclosure, the CSI-RS resource belongs to a CSI-RS resource set; and the at least one CSI-RS resource includes: all or some CSI-RS resources in the CSI-RS resource set.

In some embodiments of this disclosure, that at least one CSI-RS resource is associated with one SSB resource may include that the at least one CSI-RS resource is in a same DRS slot as the SSB resource.

In some embodiments of this disclosure, the SSB resource includes a PSS and an SSS, and that at least one CSI-RS resource is associated with one SSB resource may include that the at least one CSI-RS resource is located on another RE of a symbol on which the PSS or the SSS is located; or that the at least one CSI-RS resource is located on an RE on which an original PBCH in the SSB resource is located; or that the at least one CSI-RS resource is located on another RE of a symbol on which an original PBCH in the SSB resource is located.

In some embodiments of this disclosure, that at least one CSI-RS resource is associated with one SSB resource includes that the at least one CSI-RS resource is located on another RE of a symbol on which the SSB resource is located.

In some embodiments of this disclosure, there is another downlink symbol after the SSB resource in a slot in which the SSB resource is located, and that at least one CSI-RS resource is associated with one SSB resource may include that the at least one CSI-RS resource is located on the another downlink symbol, or that the at least one CSI-RS resource is located on a downlink symbol in another slot after the slot in which the SSB resource is located.

In some embodiments of this disclosure, there is no other downlink symbol after the SSB resource in a slot in which the SSB resource is located, and that at least one CSI-RS resource is associated with one SSB resource may include that the at least one CSI-RS resource is located on a downlink symbol in another slot after the slot in which the SSB resource is located.

In some embodiments of this disclosure, the information related to CSI-RS resources that are used for beam measurement on a UFB includes that at least one CSI-RS resource is associated with one TRS resource.

In some embodiments of this disclosure, the information related to CSI-RS resources that are used for beam measurement on a UFB may further include that the TRS resource is located on a same symbol as one SSB resource, or that the TRS resource is associated with one SSB resource and the TRS resource and the SSB resource are located on different symbols.

In some embodiments of this disclosure, a sub-time unit in the configuration information is less than one symbol. The sub-time unit is a time unit used to measure link quality of a beam pair formed by a transmit beam and a receive beam. When the sub-time unit in the configuration information is less than one symbol, the terminal device can measure a plurality of CSI-RS resources within one symbol, thereby improving the speed of beam measurement.

In some embodiments of this disclosure, the time-domain transmission mode of the CSI-RS resource is the semi-persistent mode; and the processor 705 may further be configured to: receive a MAC CE command from the network-side device, and activate the CSI-RS resource according to the MAC CE command.

In some embodiments of this disclosure, the time-domain transmission mode of the CSI-RS resource is the aperiodic mode; and the processor 705 may further be configured to receive physical layer signaling from the network-side device to trigger the CSI-RS resource set to which the CSI-RS resource belongs.

In some embodiments of this disclosure, the processor 705 may be specifically configured to receive group common DCI or a UL-grant signaling field from the network-side device to trigger the CSI-RS resource set to which the CSI-RS resource belongs. The group common DCI is carried by a non-scheduling PDCCH, and the UL-grant signaling field is carried by a scheduling PDCCH.

In some embodiments of this disclosure, a new DCI format may be used for the group common DCI, so that the group common DCI carries a signaling field used for triggering an aperiodic CSI-RS resource, that is, the DCI may include a signaling field used for triggering the aperiodic CSI-RS resource.

In some embodiments of this disclosure, the processor 705 may further be configured to: use an average of at least one measurement result of one CSI-RS resource as a final beam measurement result of the CSI-RS resource, or select one measurement result from the at least one measurement result as the final beam measurement result of the CSI-RS resource.

The audio circuit 706 may convert audio data received by the RF unit 701 or the Wi-Fi module 707 or stored in the memory 702 into an audio signal and output the audio signal as a sound. Furthermore, the audio circuit 706 may also provide audio output (for example, a call signal received sound or a message received sound) related to a specific function performed by the terminal device. The audio circuit 706 includes a speaker, a buzzer, a telephone receiver, and the like.

The Wi-Fi module 707 provides a user with wireless broadband internet access, for example, helping the user to send or receive an e-mail, to browse a web page, or to access streaming media.

The power supply 708 may be logically connected to the processor 705 through a power management system, so that functions such as charge and discharge management and power consumption management are implemented by using the power management system.

In this way, the terminal device receives the configuration information and CSI-RS resource sent by the network-side device, and performs beam measurement on the UFB based on the configuration information and the CSI-RS resource. This can reduce a quantity of LBT procedures before the beam measurement and reduce system overheads.

Optionally, an embodiment of this disclosure further provides a terminal device, including a processor 705, a memory 702, and a program that is stored in the memory 702 and capable of running on the processor 705, where when the program is executed by the processor 705, the procedures of the foregoing beam measurement method embodiment applied to a terminal device is implemented, with the same technical effects achieved. To avoid repetition, details are not described herein again.

An embodiment of this disclosure further provides a computer-readable storage medium, where the computer-readable storage medium stores a computer program, and when the computer program is executed by a processor, the procedures of the foregoing beam measurement method embodiment is implemented, with the same technical effects achieved. To avoid repetition, details are not described herein again. The computer-readable storage medium may be a read-only memory (ROM), a random access memory (RAM), a magnetic disk, an optical disc, or the like.

It should be specified that this disclosure is not limited to the specific configuration and processing described above and shown in the drawings. For brevity, a detailed description of known methods is omitted herein. In the foregoing embodiments, several specific steps are described and shown as examples. However, the method process of this disclosure is not limited to the specific steps described and shown, and a person skilled in the art can make various changes, modifications, and additions, or change the order of the steps after understanding the spirit of this disclosure.

It should also be noted that the exemplary embodiments mentioned in this disclosure describe some methods or systems based on a series of steps or devices. However, this disclosure is not limited to the order of the foregoing steps. To be specific, the steps may be performed in the order mentioned in the embodiments, or may be performed in an order different from that in the embodiments, or several steps may be performed at the same time.

The foregoing descriptions are merely specific embodiments of this disclosure. A person skilled in the art may clearly understand that, for ease and brevity of description, for specific working processes of the system, module, and unit described above, reference may be made to the corresponding processes in the foregoing method embodiments. Details are not described herein again. It should be understood that the protection scope of this disclosure is not limited to thereto. Various equivalent modifications or replacements readily figured out by a person skilled in the art within the technical scope disclosed in this disclosure shall fall within the protection scope of this disclosure.

The invention claimed is:

1. A beam measurement method, comprising:
sending, by a network-side device, configuration information to a terminal device, wherein the configuration information comprises information related to channel state information-reference signal (CSI-RS) resources that are used for beam measurement on an unlicensed frequency band (UFB); and
sending, by the network-side device, a CSI-RS resource to the terminal device based on the configuration information, so that the terminal device performs beam measurement on the UFB based on the configuration information and the CSI-RS resource, wherein an average of at least one measurement result of one CSI-RS resource is used by the terminal device as a final beam measurement result of the CSI-RS resource, or one measurement result selected from the at least one measurement result is used by the terminal device as the final beam measurement result of the CSI-RS resource,
wherein the information related to CSI-RS resources that are used for beam measurement on a UFB comprises that: the CSI-RS resource has at least one slot offset, wherein the CSI-RS resource belongs to a CSI-RS resource set; or
wherein the information related to CSI-RS resources that are used for beam measurement on a UFB comprises that: at least one CSI-RS resource is associated with one synchronization signal block (SSB) resource; or
wherein the information related to CSI-RS resources that are used for beam measurement on a UFB comprises that: the at least one CSI-RS resource is associated with one tracking reference signal (TRS) resource.

2. The method according to claim 1, wherein in case that the CSI-RS resource has at least one slot offset, the information related to CSI-RS resources that are used for beam measurement on a UFB further comprises:
a time-domain transmission mode of the CSI-RS resource, and
wherein the time domain transmission mode of the CSI-RS resource is any one of the following modes:
a periodic mode, an aperiodic mode, and a semi-persistent mode.

3. The method according to claim 2, wherein the time domain transmission mode of the CSI-RS resource is the semi-persistent mode, and the method further comprises:
sending, by the network-side device, a media access control (MAC) control element (CE) command to the terminal device, so that the terminal device activates the CSI-RS resource according to the MAC CE command; or
wherein the time domain transmission mode of the CSI-RS resource is the aperiodic mode, and the method further comprises:
sending, by the network-side device, physical layer signaling to the terminal device to trigger the CSI-RS resource set.

4. The method according to claim 3, wherein the sending, by the network-side device, physical layer signaling to the terminal device to trigger the CSI-RS resource set to which the CSI-RS resource belongs comprises:
sending, by the network-side device, group common downlink control information (DCI) or an uplink grant (UL-grant) signaling field to the terminal device to trigger the CSI-RS resource set to which the CSI-RS resource belongs.

5. The method according to claim 4, wherein the DCI comprises:
a signaling field used to trigger the aperiodic CSI-RS resource.

6. The method according to claim 1, wherein in case that the at least one CSI-RS resource is associated with one SSB resource, that at least one CSI-RS resource is associated with one synchronization signal block (SSB) resource comprises that:
the at least one CSI-RS resource is in a same discovery reference signal DRS slot as the SSB resource.

7. The method according to claim 1, wherein in case that the at least one CSI-RS resource is associated with one SSB resource, the sending, by the network-side device, the CSI-RS resource to the terminal device based on the configuration information comprises:
sending, by the network-side device, the SSB resource and the CSI-RS resource associated with the SSB resource to the terminal device, and
wherein the sending, by the network-side device, the SSB resource and the CSI-RS resource associated with the SSB resource to the terminal device comprises:
if the at least one CSI-RS resource uses a same listen before talk (LBT) measurement result as the SSB resource and the LBT measurement result is that a current channel state is idle, sending, by the network-side device, the SSB resource and the CSI-RS resource associated with the SSB resource to the terminal device.

8. The method according to claim 1, wherein in case that the at least one CSI-RS resource is associated with one SSB resource, the SSB resource comprises a primary synchronization signal (PSS) and a secondary synchronization signal SSS; and
that at least one CSI-RS resource is associated with one synchronization signal block (SSB) resource comprises that:
the at least one CSI-RS resource is located on another resource element RE of a symbol on which the PSS or the SSS is located; or the at least one CSI-RS resource is located on an RE on which an original physical broadcast channel (PBCH) in the SSB resource is located; or the at least one CSI-RS resource is located on another RE of a symbol on which an original PBCH in the SSB resource is located;
or,
wherein that at least one CSI-RS resource is associated with one synchronization signal block (SSB) resource comprises that:
the at least one CSI-RS resource is located on another RE of a symbol on which the SSB resource is located;
or,
wherein there is another downlink symbol after the SSB resource in a slot in which the SSB resource is located; and
that at least one CSI-RS resource is associated with one synchronization signal block (SSB) resource comprises that:

the at least one CSI-RS resource is located on the another downlink symbol, or the at least one CSI-RS resource is located on a downlink symbol in another slot after the slot in which the SSB resource is located;

or, wherein there is no other downlink symbol after the SSB resource in a slot in which the SSB resource is located; and that at least one CSI-RS resource is associated with one synchronization signal block (SSB) resource comprises that:

the at least one CSI-RS resource is located on a downlink symbol in another slot after the slot in which the SSB resource is located.

9. The method according to claim 1, wherein in case that the at least one CSI-RS resource is associated with one TRS resource, the information related to CSI-RS resources that are used for beam measurement on a UFB further comprises that:

the TRS resource is located on a same symbol as one SSB resource, or the TRS resource is associated with one SSB resource and the TRS resource and the SSB resource are located on different symbols.

10. The method according to claim 1, wherein a sub-time unit in the configuration information is less than one symbol.

11. A network-side device, comprising: a memory, a processor, and a program that is stored in the memory and capable of running on the processor, wherein when executing the program, the processor is configured to:

send configuration information to a terminal device, wherein the configuration information comprises information related to channel state information-reference signal (CSI-RS) resources that are used for beam measurement on an unlicensed frequency band (UFB); and send a CSI-RS resource to the terminal device based on the configuration information, so that the terminal device performs beam measurement on the UFB based on the configuration information and the CSI-RS resource, wherein an average of at least one measurement result of one CSI-RS resource is used by the terminal device as a final beam measurement result of the CSI-RS resource, or one measurement result selected from the at least one measurement result is used by the terminal device as the final beam measurement result of the CSI-RS resource, wherein the information related to CSI-RS resources that are used for beam measurement on a UFB comprises that: the CSI-RS resource has at least one slot offset, wherein the CSI-RS resource belongs to a CSI-RS resource set; or wherein the information related to CSI-RS resources that are used for beam measurement on a UFB comprises that: at least one CSI-RS resource is associated with one synchronization signal block (SSB) resource; or wherein the information related to CSI-RS resources that are used for beam measurement on a UFB comprises that: the at least one CSI-RS resource is associated with one tracking reference signal (TRS) resource.

12. A beam measurement method, comprising:

receiving configuration information and a channel state information-reference signal (CSI-RS) resource from a network-side device, wherein the configuration information comprises information related to CSI-RS resources that are used for beam measurement on an unlicensed frequency band (UFB); and performing beam measurement on the UFB based on the configuration information and the CSI-RS resource, wherein the method further comprises:

using an average of at least one measurement result of one CSI-RS resource as a final beam measurement result of the CSI-RS resource, or select one measurement result from the at least one measurement result as the final beam measurement result of the CSI-RS resource, wherein the information related to CSI-RS resources that are used for beam measurement on a UFB comprises that: the CSI-RS resource has at least one slot offset, wherein the CSI-RS resource belongs to a CSI-RS resource set; or wherein the information related to CSI-RS resources that are used for beam measurement on a UFB comprises that: at least one CSI-RS resource is associated with one synchronization signal block (SSB) resource; or wherein the information related to CSI-RS resources that are used for beam measurement on a UFB comprises that: the at least one CSI-RS resource is associated with one tracking reference signal (TRS) resource.

13. The beam measurement method according to claim 12, wherein in case that the CSI-RS resource has at least one slot offset, the information related to CSI-RS resources that are used for beam measurement on the UFB further comprises:

a time-domain transmission mode of the CSI-RS resource, and wherein the time domain transmission mode of the CSI-RS resource is any one of the following modes:

a periodic mode, an aperiodic mode, and a semi-persistent mode.

14. The beam measurement method according to claim 12, wherein that at least one CSI-RS resource is associated with one synchronization signal block (SSB) resource comprises that:

the at least one CSI-RS resource is in a same discovery reference signal DRS slot as the SSB resource.

15. The beam measurement method according to claim 12, wherein in case that the at least one CSI-RS resource is associated with one SSB resource, the SSB resource comprises a primary synchronization signal (PSS) and a secondary synchronization signal SSS; and that at least one CSI-RS resource is associated with one synchronization signal block (SSB) resource comprises that:

the at least one CSI-RS resource is located on another resource element RE of a symbol on which the PSS or the SSS is located; or the at least one CSI-RS resource is located on an RE on which an original physical broadcast channel (PBCH) in the SSB resource is located; or the at least one CSI-RS resource is located on another RE of a symbol on which an original PBCH in the SSB resource is located;

or, wherein that at least one CSI-RS resource is associated with one synchronization signal block (SSB) resource comprises that:

the at least one CSI-RS resource is located on another RE of a symbol on which the SSB resource is located;

or, wherein there is another downlink symbol after the SSB resource in a slot in which the SSB resource is located; and that at least one CSI-RS resource is associated with one synchronization signal block (SSB) resource comprises that:

the at least one CSI-RS resource is located on the another downlink symbol, or the at least one CSI-RS resource is located on a downlink symbol in another slot after the slot in which the SSB resource is located;

or, wherein there is no other downlink symbol after the SSB resource in a slot in which the SSB resource is located; and that at least one CSI-RS resource is associated with one synchronization signal block (SSB) resource comprises that:

the at least one CSI-RS resource is located on a downlink symbol in another slot after the slot in which the SSB resource is located.

16. The beam measurement method according to claim 12, wherein in case that the at least one CSI-RS resource is associated with one TRS resource, the information related to CSI-RS resources that are used for beam measurement on a UFB further comprises that:

the TRS resource is located on a same symbol as one SSB resource, or the TRS resource is associated with one SSB resource and the TRS resource and the SSB resource are located on different symbols.

17. The beam measurement method according to claim 12, wherein a sub-time unit in the configuration information is less than one symbol.

18. A terminal device, comprising a memory, a processor, and a program that is stored in the memory and capable of running on the processor, wherein when the processor executes the program, the processor is configured to perform steps of the beam measurement method according to claim 12.

\* \* \* \* \*